(12) United States Patent
Flickner et al.

(10) Patent No.: US 7,688,349 B2
(45) Date of Patent: Mar. 30, 2010

(54) METHOD OF DETECTING AND TRACKING GROUPS OF PEOPLE

(75) Inventors: Myron D. Flickner, San Jose, CA (US); R. Ismail Haritaoglu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/012,628

(22) Filed: Dec. 7, 2001

(65) Prior Publication Data

US 2003/0107649 A1    Jun. 12, 2003

(51) Int. Cl.
*H04N 7/18* (2006.01)

(52) U.S. Cl. ..................................... 348/150

(58) Field of Classification Search ................. 348/150, 348/144, 143, 153, 159, 169, 148, 170; 340/541, 340/573.1; 382/103; *H04N 7/18*
See application file for complete search history.

(56) References Cited

U.S. PATENT DOCUMENTS

| | | | | |
|---|---|---|---|---|
| 5,097,328 A * | 3/1992 | Boyette | ...................... | 348/150 |
| 5,121,201 A | 6/1992 | Seki | ............................ | 358/108 |
| 5,138,638 A | 8/1992 | Frey | ............................... | 377/6 |
| 5,216,502 A * | 6/1993 | Katz | ........................... | 348/150 |
| 5,465,115 A | 11/1995 | Conrad et al. | ................ | 348/155 |
| 5,513,854 A * | 5/1996 | Daver | .......................... | 700/91 |
| 5,581,625 A * | 12/1996 | Connell | ...................... | 382/100 |
| 5,714,997 A * | 2/1998 | Anderson | .................... | 348/39 |
| 5,764,283 A | 6/1998 | Pingali et al. | ............... | 348/169 |
| 5,821,987 A * | 10/1998 | Larson | ................... | 348/14.15 |
| 5,835,616 A * | 11/1998 | Lobo et al. | .................. | 382/118 |
| 5,923,365 A * | 7/1999 | Tamir et al. | ................. | 348/169 |
| 5,953,055 A * | 9/1999 | Huang et al. | ................ | 348/155 |
| 5,973,732 A * | 10/1999 | Guthrie | ...................... | 348/169 |
| 6,028,626 A * | 2/2000 | Aviv | ........................... | 348/152 |
| 6,061,088 A | 5/2000 | Khosravi et al. | ............ | 348/169 |
| 6,141,041 A * | 10/2000 | Carlbom et al. | ............. | 348/169 |
| 6,141,433 A * | 10/2000 | Moed et al. | ................. | 382/103 |
| 6,185,314 B1 | 2/2001 | Crabtree et al. | ............. | 382/103 |
| 6,195,121 B1 | 2/2001 | Huang et al. | ................. | 348/150 |
| 6,263,088 B1 | 7/2001 | Crabtree et al. | ............. | 382/103 |
| 6,295,367 B1 | 9/2001 | Crabtree et al. | ............. | 382/103 |
| 6,441,734 B1 * | 8/2002 | Gutta et al. | .................. | 340/541 |
| 6,441,846 B1 * | 8/2002 | Carlbom et al. | ............. | 348/169 |

(Continued)

OTHER PUBLICATIONS

Rosales et al., "3D Trajectory Recovery for Tracking Multiple Objects and Trajectory Guided Recognition of Actions," Proc. IEEE Conf. On Computer Vision and Pattern Recognition, Jun. 1999, Fort Collins, Colorado.

(Continued)

*Primary Examiner*—Tung Vo
(74) *Attorney, Agent, or Firm*—Daniel E. Johnson

(57) ABSTRACT

A computer-interfaced camera system identifies and tracks groups of socially interrelated people. The system can be used, for example, to track people as they wait in a checkout line or at a service counter. In a preferred implementation, each recorded camera frame is segmented into foreground regions containing several people. The foreground regions are further segmented into individuals using temporal segmentation analysis. Once an individual person is detected, an appearance model based on color and edge density in conjunction with a mean-shift tracker is used to recover the person's trajectory. Groups of people are determined by analyzing inter-person distances over time.

23 Claims, 6 Drawing Sheets

U.S. PATENT DOCUMENTS

| | | | |
|---|---|---|---|
| 6,542,750 B2 * | 4/2003 | Hendrey et al. | 455/456.1 |
| 6,633,232 B2 * | 10/2003 | Trajkovic et al. | 340/573.1 |
| 6,654,047 B2 * | 11/2003 | Iizaka | 348/143 |
| 6,671,390 B1 * | 12/2003 | Barbour et al. | 382/103 |
| 6,697,104 B1 * | 2/2004 | Yakobi et al. | 348/143 |
| 6,707,487 B1 * | 3/2004 | Aman et al. | 348/169 |
| 6,954,498 B1 * | 10/2005 | Lipton | 375/240.08 |
| 6,967,674 B1 * | 11/2005 | Lausch | 348/143 |
| 7,110,569 B2 * | 9/2006 | Brodsky et al. | 382/103 |
| 7,167,576 B2 * | 1/2007 | Steenburgh et al. | 382/103 |
| 7,319,479 B1 * | 1/2008 | Crabtree et al. | 348/169 |
| 2003/0058111 A1 * | 3/2003 | Lee et al. | 340/573.1 |
| 2003/0058341 A1 * | 3/2003 | Brodsky et al. | 348/169 |

OTHER PUBLICATIONS

Javed et al., "Camera Handoff: Tracking in Multiple Uncalibrated Stationary Cameras,"Proc. IEEE Workshop on Human Motion HUMO-2000, Austin, Texas, Dec. 7-8, 2000.

Waters et al., "Visual Sensing of Humans for Active Public Interfaces," Digital Equipment Corporation / Cambridge Research Lab—Technical Report CRL 96/5, Mar. 1996.

Wren et al., "Pfinder: Real-Time Tracking of the Human Body," M.I.T. Media Lab. Preceptual Computing Section Tech. Report No. 353, IEEE Transactions on Pattern Analysis and Machine Intelligence, Jul. 1997, vol. 19, No. 7, pp. 780-785.

Haritaoglu et al., "W4: Real-Time Surveillance of People and Their Activities," IEEE Transactions on Pattern Analysis and Machine Intelligence, Aug. 2000.

Horprasert et al., "A Robust Background Subtraction and Shadow Detection," Proceedings of Asian Conference on Computer Vision, Taiwan, Jan. 2000.

Stauffer et al., "Adaptive background mixture models for real-time tracking," IEEE Computer Vision and Pattern Recognition Conf., Fort Collins, Colorado, Jun. 1999.

D. M. Gavrila., The Visual Analysis of Human Movement: A Survey., Pub. In Computer Vision and Image Understanding, vol. 73, No. 1, pp. 82-98, 1999, Academic Press.

Elgammal et al., "Non-parametric Model for Background Subtraction," IEEE Frame Rate Workshop, Sep. 1999, Corfu, Greece.

Comaniciu et al., Real-Time Tracking of Non-Rigid Objects Using Mean Shift, IEEE Computer Vision and Pattern Recognition Conference, Jun. 2000, Hilton Island, So. Carolina.

Darrell et al., "Integrated Person Tracking Using Stereo, Color, and Pattern Detection," IEEE Computer Vision and Pattern Recognition Conf., 1998, Santa Barbara, California, pp. 601-609.

Collins et al., "A System for Video Surveillance and Monitoring," VSAM Final Technical Report, CMU-RI-TR-00-12, Robotics Institute, Carnegie Mellon University, May 2000.

Davis et al., "The Representation and Recognition of Action Using Temporal Templates." M.I.T. Media Laboratory Perceptual Computing Section Tech. Report No. 402. Appears in IEEE Conference on Computer Vision and Pattern Recognition (CVPR'97), Jun. 1997.

Beymer et al., "Real-Time Tracking of Multiple People Using Continuous Detection," IEEE Frame Rate Workshop, 1999.

* cited by examiner

METHOD OF DETECTING AND TRACKING GROUPS OF PEOPLE

TECHNICAL FIELD

The invention is in the field of video surveillance, and more particularly, the invention relates to the ability to detect and track groups of people.

BACKGROUND

Recent advances in camera technology and increased processor power have enabled surveillance systems to monitor human activities in real-time. (See, for example, D. M. Gavrila, "The visual analysis of human movement: a survey", Computer Vision and Image Understanding, vol. 73, pp. 82-98, 1999.) Surveillance cameras are commonly used in stores, hallways, and along streets for security applications such as crime-prevention or post-crime investigations. On the other hand, retail store managers are also interested in using cameras to extract business intelligence information. Retailers desire real-time information about customer traffic patterns, queue lengths, and check-out waiting times to improve operational efficiency and customer satisfaction. They are more interested in determining the number of shopping groups within their stores than the total number of people who frequent them.

There have been a number of studies on detecting and tracking people. (See, for example, D. Beymer et al., "Real-time tracking of multiple people using continuous detection," IEEE Frame Rate Workshop, Cofu, Greece, 1999; J. W. Davis et al., "The representation and recognition of action using temporal templates," IEEE Conference on Computer Vision and Pattern Recognition, June 1997; T. Darrell et al., "Integrated person tracking using stereo, color, and pattern detection," IEEE Computer Vision and Pattern Recognition Conference, Santa Barbara, Calif., 1998; K. Waters et al., "Visual sensing of humans for active public interfaces," Digital Equipment Corporation/Cambridge Research Lab Technical Report CRL 96/5, March 1996; R. Rosales et al., "3-D trajectory recovery for tracking multiple objects and trajectory guided recognition of actions," Proceedings IEEE Conference on Computer Vision and Pattern Recognition, June 1999; R. T. Collins et al., "A system for video surveillance and monitoring," VSAM Final Technical Report, CMU-RI-TR-00-12, Robotics Institute, Carnegie Mellon University, May 2000; C. Wren et al., "Pfinder: real-time tracking of the human body," IEEE Transactions on Pattern Analysis and Machine Intelligence, vol. 19, pp. 780-785, July 1997.) However, these investigators have not addressed the issue of detecting and locating people as they move as a group.

The ability to visually detect and track groups of people and their activities in crowded areas therefore remains an important problem. This problem is complicated by the fact that when people interact with each other, they are often partially or totally occluded.

SUMMARY OF THE INVENTION

A real-time camera/computer system and method for identifying groups of socially interrelated people by detecting and tracking them is disclosed. In one preferred embodiment, groups of people at a checkout line in a store are monitored. In this context, the group of interest is a "shopping group", e.g., that set of people who check out together at the register. One camera may be used, or a plurality of cameras may be used to cover a larger area.

In preferred embodiments, the tracking of individuals is accomplished by identifying those pixels in a recorded camera frame corresponding to people and other moving objects as a "silhouette" image of pixels, determining how many people make up that silhouette, and segmenting the silhouette into respective profiles of the individuals. The individuals may then be grouped together, e.g., according to their spatial relationship to one another. In a preferred embodiment situated in a retail context, this is done by noting that people in a given shopping group stay closer to each other than they do to people in a different shopping group. Additionally, people who belong to the same shopping group are found to exhibit similar global motion patterns, e.g., they move forward together to the register after the transaction of the group in front of them has been completed, and exit the scene together after having completed their own transaction.

In a preferred implementation, the system segments each recorded camera frame into foreground and background (including shadow) pixel regions using a statistical background model based on RGB (red, green, blue) color constancy and brightness. Since the foreground may contain several individuals and more than one group, the foreground is advantageously segmented into individual profiles using temporal segmentation based on motion cues. A temporal silhouette image (or "map") of pixels is then constructed that combines foreground detection and motion-detection results over a period of time. The temporal silhouette map may then be segmented into profiles of individuals. Once an individual is detected, an appearance model based on color and texture is created, and a tracking algorithm (such as a mean-shift tracker) is employed to recover the trajectory of each individual in the scene. Individuals are grouped together as groups (e.g., shopping groups) by analyzing their relative distances to other individuals given the recovered trajectories. This analysis can be conceptualized as a graph partitioning problem: When detection and tracking results are represented by a weighted graph, the strongly connected components of the partitioned graph represent groups.

In a preferred implementation of the invention, retail managers may use such information about groups to help them manage customer traffic patterns, queue lengths, and waiting times. For example, operational efficiency and customer satisfaction may be improved when a manager opens up an additional checkout lane if the number of groups detected in one of the checkout lanes exceeds a predetermined value. Additionally, the activities of the cashier may be monitored to determine when shopping transactions start and end and thereby more precisely establish the number of groups in a checkout lane.

In one preferred implementation of the invention, there is provided a method of detecting groups of socially-interrelated individuals within a number of people. The method includes visually recording movement of the people over time by generating a series of images. The presence of individuals is detected in the images, and their movement is tracked to determine their respective trajectories. The trajectories are then analyzed to determine the existence of the groups. In a preferred implementation of the method, analyzing the trajectories includes determining relative distances between individuals. One preferred implementation of the method includes constructing, for at least a first image, a modified image of pixels in which pixels corresponding to objects whose positions remain fixed are excluded from the modified image, temporally segmenting the modified image, and assigning respective portions of the modified image to the individuals. In another preferred implementation of the method, at least some of the groups are waiting in a line (such as a checkout lane in a store), and the method further comprises counting the number of groups in the line, thereby permitting additional resources (e.g., at least one additional checkout lane) to be opened when the number of groups in the line exceeds a predetermined number. In yet another preferred implementation of the method, the movement of the people may be recorded with more than one camera, in which the cameras are directed at overlapping spatial regions.

In another preferred implementation of the method, there is provided a method of identifying shopping groups in a checkout lane. The method includes camera recording people in the checkout lane (thereby generating a series of images), resolving individual persons within the images, and determining relative distances between the persons over time to identify shopping groups in the checkout lane. A preferred implementation of the method further includes electronically counting the number of shopping groups in the checkout lane, and opening at least one additional checkout lane in response to said counting.

In other implementations of the invention, there are provided computer program products for carrying out any of the methods herein.

BRIEF DESCRIPTION OF THE DRAWINGS

FIG. 2, which includes

DETAILED DESCRIPTION OF THE INVENTION

In preferred implementations of the invention, 1) individuals are detected through a two part process involving a) "silhouette detection", i.e., identifying those pixels in a recorded camera frame corresponding to people and other moving objects and b) resolving individuals from these silhouettes, 2) individuals are then tracked, and 3) groups of individuals are then detected. Preferred embodiments of the invention are directed to detecting and tracking groups of socially interrelated individuals, e.g., people who have some familiarity with each other and have congregated for some purpose such as shopping, touring a museum, or a political fund raiser. A group may be a clique, a family unit, or a group of friends, among other possibilities.

Figure 1:
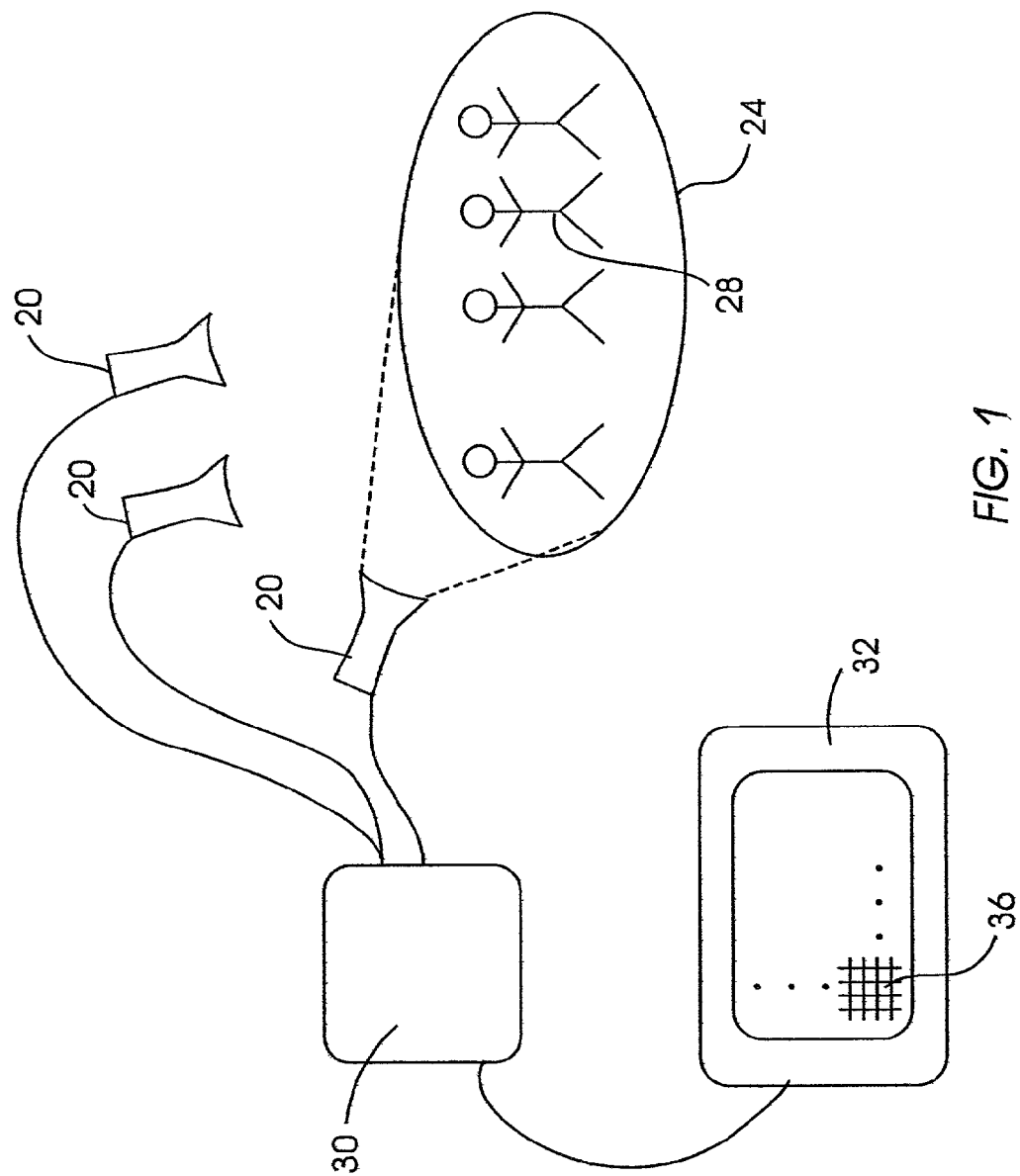
FIG. 1 is a schematic of a system, in which a camera records several people and sends the output to a processor such as a computer.

One system for implementing the invention is shown in FIG. 1, in which a (one or more) camera 20 collects images from an area 24 where a number of individuals 28 are located. Output from the camera 20 is directed into a computer 30 where it is processed. Images from the computer 30 may be viewed on a monitor 32 having a number of pixels 36. Working embodiments of the herein-described invention included a 933 MHz Pentium III computer, which processed 320×240 resolution video taken at 10-30 frames per second.

Detection of Individuals

1a. Silhouette Detection

Background subtraction, the process of subtracting from a given image a corresponding reference image, is a simple and fast way to obtain foreground regions and has been employed by many surveillance systems. Several investigators have used a variety of background models, e.g., normal distribution (see C. Wren et al., supra), mixture of Gaussian (see C. Stauffer et al., "Adaptive background mixture models for real-time tracking," IEEE Computer Vision and Pattern Recognition Conference, Fort Collins, Colo., June 1999), non-parametric mode (see A. Elgammal, "Non-parametric model for background subtraction," IEEE Frame Rate Workshop, Corfu, Greece, September 1999), and different background properties for indoor or outdoor scenes. These algorithms typically have difficulty handling global or local illumination changes due to shadows, resulting in a failure to detect the true silhouettes due to false detections in and around the area of the shadows. Recently, a robust and efficient background subtraction algorithm that copes with shadows was proposed by Horprasert. (See T. Horpraset, "A robust background subtraction and shadow detection", Proceedings of Asian Conference on Computer Vision, Taiwan, January 2000.) The background (as used herein, those objects that remain fixed over time, regardless whether they are close to or far from the camera) is determined by computing a statistical average of the color chromaticity and brightness of each pixel over a period of time. During silhouette detection in the Horpraset method, the chromaticity distortion and brightness distortion are computed for each pixel, and each pixel is assigned to the foreground (as used herein, those objects that move in and out of the camera view, regardless whether they are close to or far removed from the camera) or the background (corresponding to stationary objects).

Figure 2A:
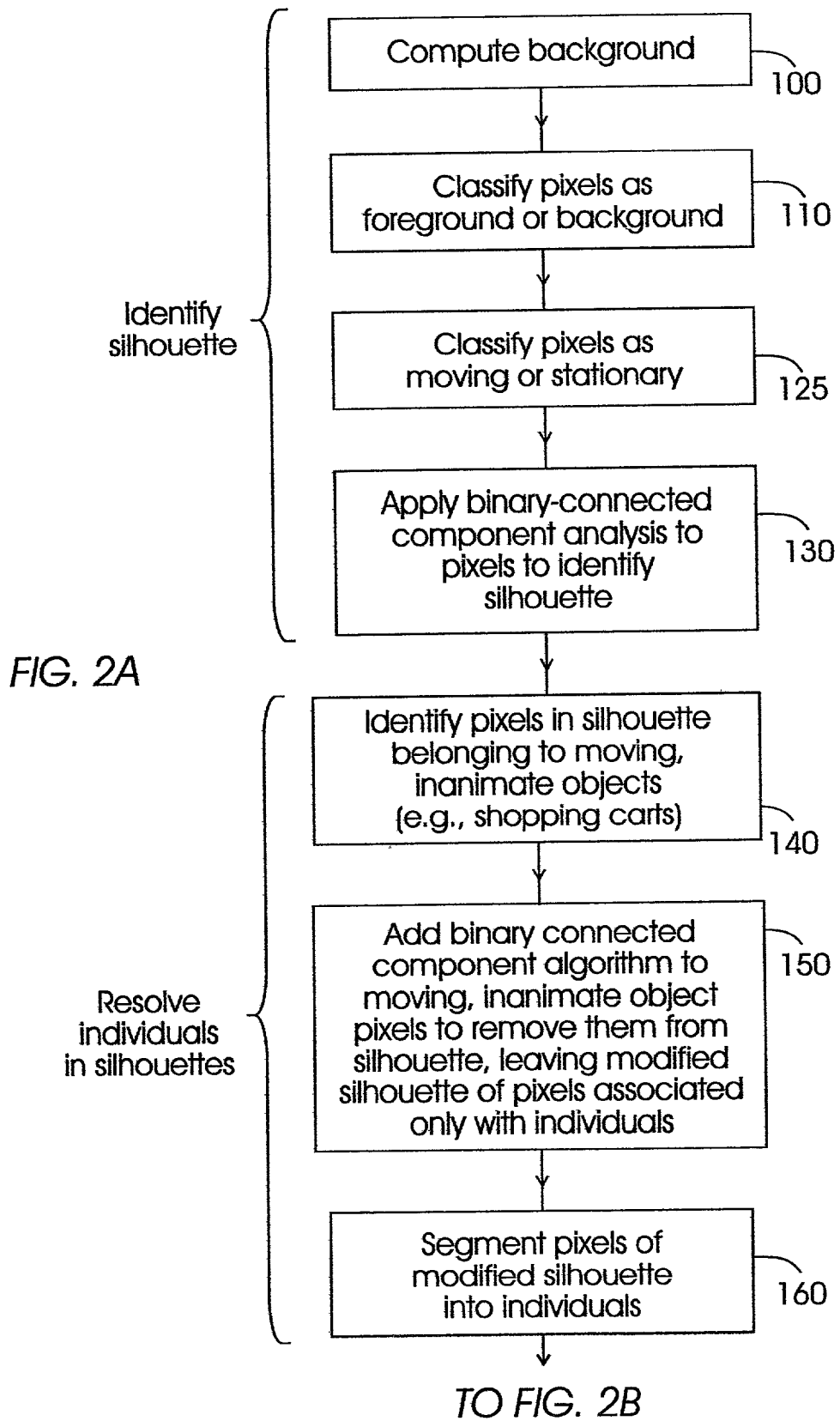
FIGS. 2A and 2B, is a flow chart outlining a preferred method of the invention.
Figure 2B:
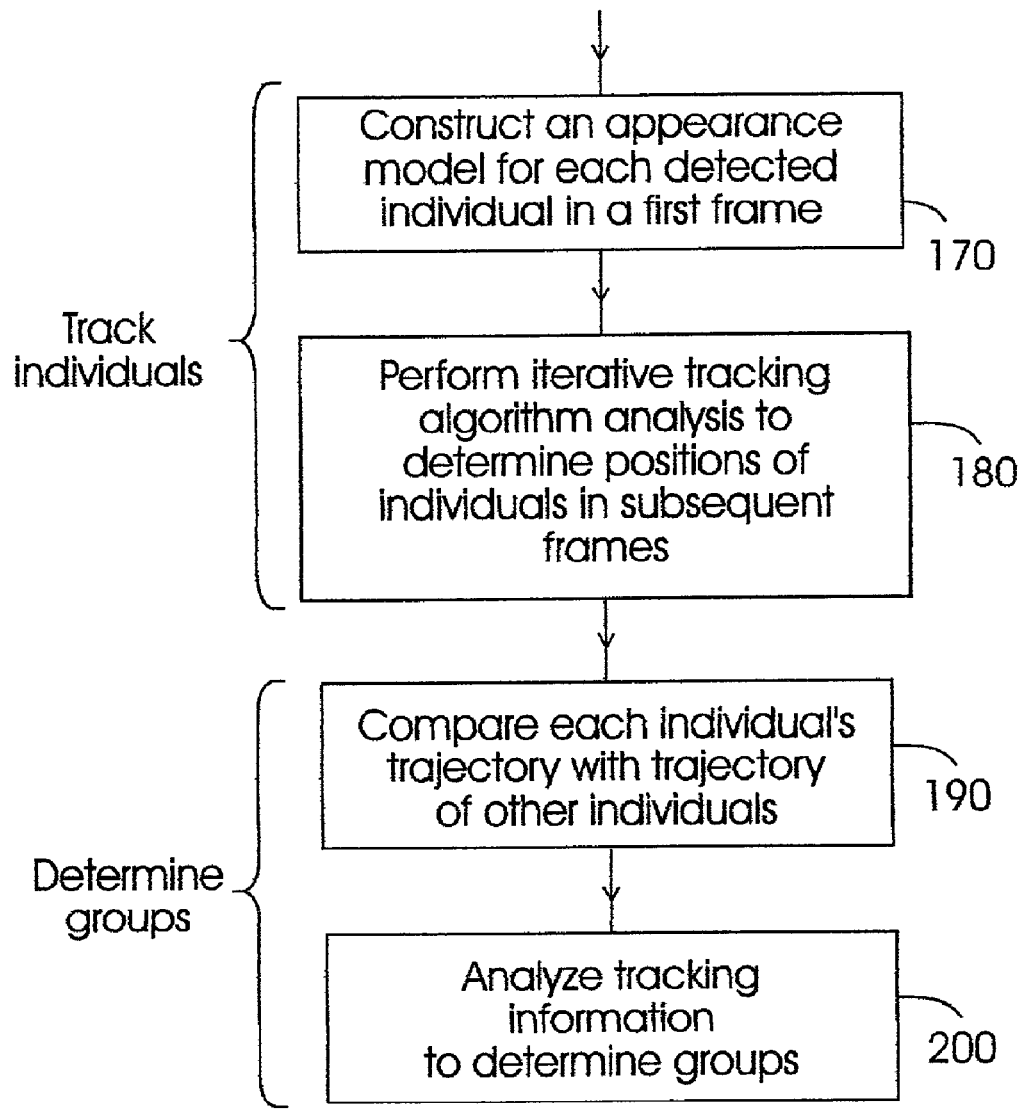

A preferred foreground detection method for use with the invention herein employs a two-stage process that excludes those pixels corresponding to moving objects before obtaining the initial background statistics (corresponding to step 100 of FIG. 2). Shadows may be treated as belonging to the background. In the first stage, a temporal median filter is applied to several seconds of video (typically 20-40 seconds) to distinguish "moving pixels" (pixels corresponding to moving objects) from "stationary pixels" (pixels corresponding to stationary objects) by monitoring color and assuming that a color that predominates at a given pixel over time is representative of the background image, since any object corresponding to a foreground image is expected to move in and out of the camera's view over time. In the second stage, only those stationary pixels just identified are processed to construct the background. The background is updated periodically to adapt to illumination changes due to sunlight, clouds, and interior lighting. This two stage approach also accommodates changes in physical layout, such as (in the case of a retail outlet) new or moved merchandise or an abandoned shopping basket.

In order to reduce false positive errors caused by camera jitter and digitization, a number of consecutive foreground detection results are combined to obtain a foreground "silhouette", in which the silhouette corresponds to an image of any moving objects alone with the background information having been deleted (step 110). Typically, a pixel is classified as a foreground silhouette pixel $P_s(x)$ if it was detected as a foreground pixel during the last f consecutive frames where (by way of example) f=5:

$$P_s(x)=1 \text{ if } S_d(x,t) \geq f. \quad (1)$$

Here x is a vector representing the coordinate index to the pixel. The variable t here corresponds to the frame number (and thus represents time), and each frame corresponds to ⅓₀ second. $S_d(x,t)$ is the detection support map that represents the number of times a pixel location is classified as a foreground pixel consecutively, and is computed as $$S_d(x, t) = \begin{cases} S_d(x, t-1) + 1 & \text{if } x \text{ is foreground pixel} \\ 0 & \text{if } x \text{ is background pixel} \end{cases}$$

Figure 3A:
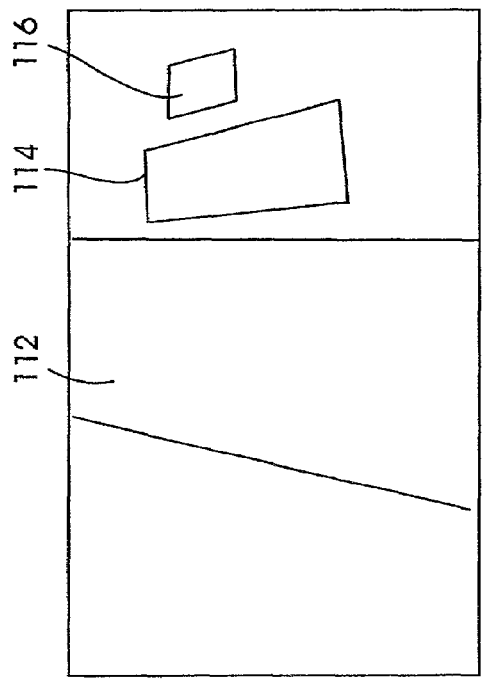
FIGS. 3A and 3B are schematic outlines of images acquired by a camera trained on a checkout lane of a store, showing empty and occupied checkout lanes, respectively.
Figure 3B:
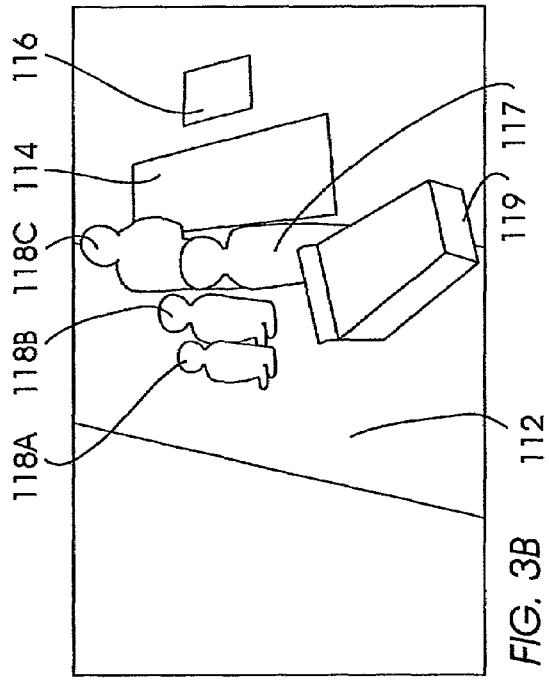

For computational efficiency, the image corresponding to the entire camera viewing area may be divided into subregions, as illustrated in FIG. 3A, which shows the outline of prominent objects in a camera image. Here the viewing area is of where shoppers in a store wait in line, and the subregions advantageously correspond to different functions: a checkout lane 112 (where people wait), a conveyor belt 114 (onto which merchandise is placed), and a register 116 (where the cashier is located). FIG. 3B shows the same viewing area, but with the presence of four individuals 117, 118*a*, 118*b*, 118*c* and a shopping cart 119 all located in the checkout lane 112. A binary connected-component algorithm can be applied to the $P_s(x)$ values in the functional area(s) of interest to obtain a foreground silhouette for a particular sub-region (s). In this particular retail application, only the foreground silhouette detected in the area around the lane 112 is analyzed to detect people and shopping carts.

Figure 4:
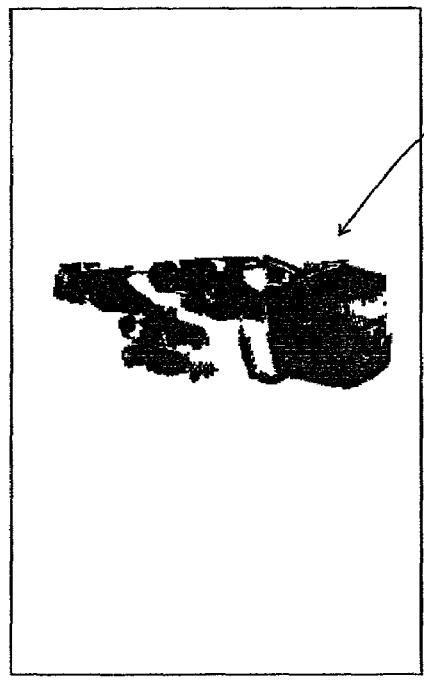
FIG. 4 is an image of the pixels (a "silhouette") corresponding to the moving objects (including people) within the checkout lane of FIG. 3B.

A silhouette 121 is shown in FIG. 4 and is derived from the camera view of FIG. 3B. The silhouette 121 includes those pixels corresponding to both the individuals 117, 118*a*, 118*b*, 118*c* and any moving objects (in this case, the shopping cart 119). This silhouette is derived by taking advantage of the fact that since people move their bodies while waiting, they create motion over short periods of time that can be detected with visual means, e.g., with a camera. This motion is helpful in identifying pixels associated with individuals from the global silhouette 121. Each foreground silhouette pixel may be classified with motion information based on multi-frame frame differencing. A foreground silhouette pixel is classified as a moving pixel $P_m(x)$ (step 125), and is defined to be 0 unless the following condition is met:

$$P_m(x) = 1 \text{ if } \begin{cases} \sum_{c=r,g,b} |I^c(x, t) - I^c(x, t+1)| > 6 * \sigma_c \\ \text{and} \\ \sum_{c=r,g,b} |I^c(x, t-1) - I^c(x, t)| > 6 * \sigma_c \end{cases} \quad (3)$$

Here $\sigma_c$ is the standard deviation of a given color band c (red, green, or blue) of pixel x in the background, and $I^c(x,t)$ is the color of pixel x in frame t and color band c. A connected component algorithm (step 130) is applied to foreground pixels to obtain a silhouette, such as those algorithms discussed in "Fundamentals of Digital Image Processing" (A. Jain, 1988) and in volume 1 of "Computer and Robot Vision" (Robert Haralick and Linda Shapiro, Addison Wesley, 1992).

1b. Resolving Individuals from Silhouettes ("Person Segmentation")

Figure 5:
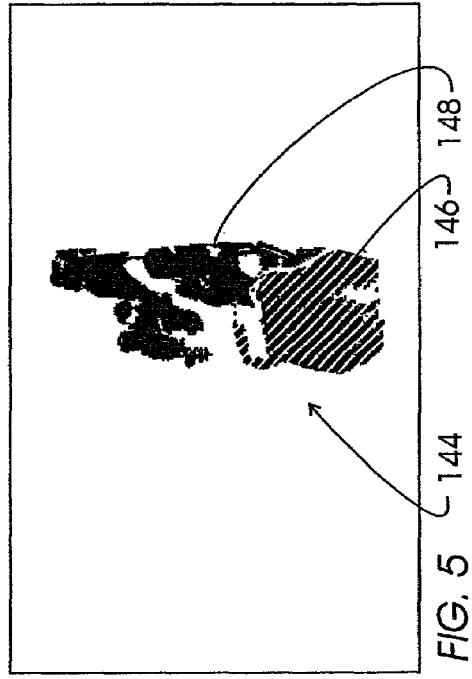
FIG. 5 is a modified version of the silhouette shown in FIG. 4, in which an inanimate object (in this case, a shopping cart) has been distinguished from the rest of the silhouette.

Shopping carts themselves (and moving inanimate objects generally) may be detected using color (step 140). The color of shopping carts may be modeled using a single 3-D Gaussian distribution, with the pixel of any foreground silhouette pixel that has a color similar to that distribution being classified as a pixel belonging to a shopping cart. A resulting modified silhouette 144 is shown in FIG. 5, and shows a hatched region 146 corresponding to the shopping cart 119. The remainder 148 of the silhouette 144 corresponds to the individuals 118*a*, 118*b*, 118*c*, 119.

Figure 6B:
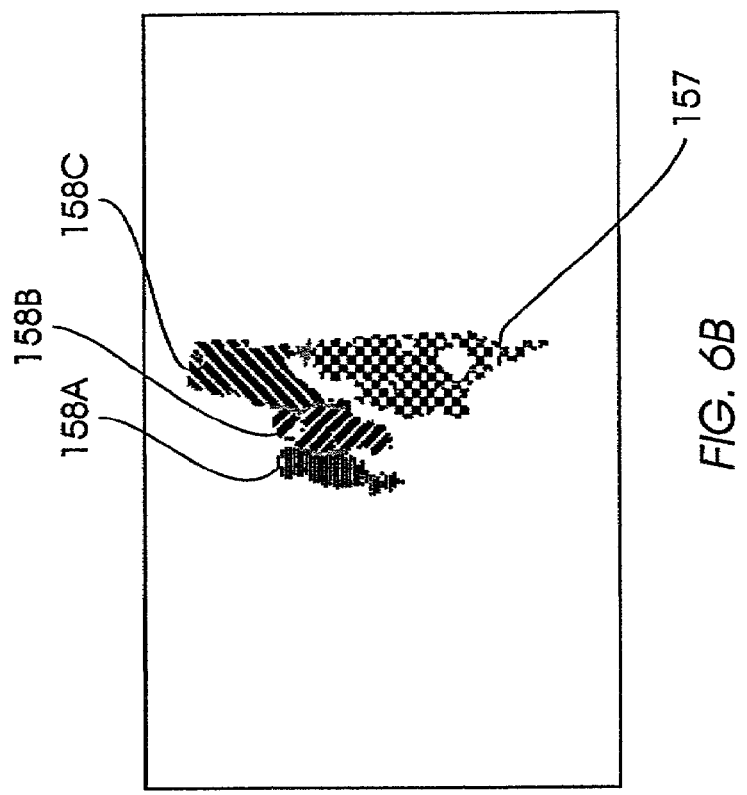
FIG. 6B shows the silhouette of FIG. 6A segmented into profiles corresponding to respective individuals.
Figure 6A:
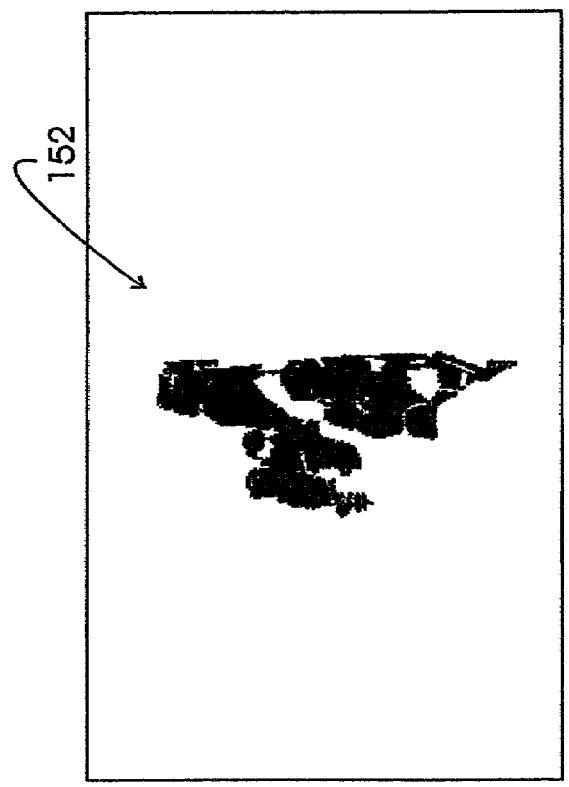
FIG. 6A is the silhouette of FIG. 5 with the inanimate object having been removed.

A connected component algorithm is applied (step 150) to those pixels identified in step 140. Specifically, the contour that these pixels form is compared to the contour of a shopping cart, so that pixels matching a shopping cart's contour can then be extracted from the modified silhouette 144. Once these pixels are removed from the modified silhouette 144, a final silhouette 152 containing only people is formed, as shown in FIG. 6A.

Although the binary foreground silhouette 152 locates people in the scene, it does not distinguish between individuals. Person segmentation is used to address this problem (step 160). As shown in FIG. 6B, this process results in partitioning the people silhouette 152 into profiles 157, 158*a*, 158*b*, 158*c* (corresponding to individuals 117, 118*a*, 118*b*, 118*c*, respectively). Two kinds of information that can be used to segment a people silhouette 152 into individual persons are temporal constraints and global motion.

An example of a temporal constraint is that people who belong to same shopping group enter and exit the scene together, even though the amount of time individuals spend in the field of view may differ between shopping groups. Each temporally coherent region of the silhouette represents a person or group of people who enter the scene together. If a temporal value is assigned to each pixel indicating how long an individual has been detected, the foreground of the silhouette can be segmented into temporally coherent regions. In preferred embodiments, this temporal coherency permits the foreground silhouette to be broken down into profiles of individuals, like the profiles 157, 158*a*, 158*b*, 158*c*, 158*d* of FIG. 6B.

Global motion is concerned with the fact that people in groups tend to show similar movement patterns during checkout. For example, they place merchandise on the shopping belt from carts or baskets and wait their turn for the items to be scanned. While unloading and waiting, body motion consists primarily of head and hand movements. Once the customer being served is finished, the remaining customers move forward as a group, which results in body motion from an number of individuals. In preferred embodiments herein, the local motion information created by a small amount of body/torso movement permits the silhouette boundaries of each individual to be identified.

To generate profiles such as those shown in FIG. 6B, a dynamic silhouette model that takes advantage of the above-described temporal constraint and global motion is used. A temporal silhouette map Ψ is defined that accounts for both foreground silhouette detection and motion detection over time and makes it possible to assign temporal information to each pixel about its detection duration:

$$\Psi^t(x) = \begin{cases} \Psi^{t-1}(x) + 1 & \text{if } P_s(x) = 1 \text{ and } P_m(x) = 0 \\ \Psi^{t-1}(x + \mu(x)) & \text{if } P_s(x) = 1 \text{ and } P_m(x) = 1 \\ 0 & \text{if } P_s(x) = 0 \end{cases}$$

where $P_s(x)$ and $P_m(x)$ are as defined previously. Here $\mu(x)$ is the silhouette local displacement (at pixel location x) from the previous frame to the current frame. A binary edge correlation is performed between the current and previous silhouette edge profiles to estimate the local displacement $\mu(x)$ of a pixel. This correlation is then computed for pixel displacements over a 5×3 set of pixels. Typically, the correlation is dominated by the torso and head edges, whose shape changes slowly from frame to frame.

A temporal silhouette map is advantageously segmented into sub-regions, in which each pixel within a given sub-region has similar $\Psi(x)$ values. A connected component algorithm is applied to the temporal silhouette map, in which a pixel x is connected to one of its 8 neighboring pixels x' if $$|\Psi^t(x) - \Psi^t(x')| < \epsilon \tag{5}$$

in which $\epsilon$ is a time-interval threshold that is predetermined experimentally and is typically 50. This "fuzzy" temporal segmentation permits the profile of each individual person to be resolved from the corresponding people silhouette.

2. Tracking of Individuals Using an Appearance Model

When a new person in a scene is detected, an appearance model is constructed so that that person can be tracked in subsequent frames. Once an individual has been detected, that individual is then tracked as long as he or she remains within the camera's field of view. Tracking an individual, however, is complicated by the fact that he or she may be partially or totally occluded at various times. For example, in a retail context in which shoppers are waiting in a checkout lane, people move while communicating with each other, loading or unloading merchandise, etc., which may result in one individual moving in behind or stepping out in front of another person (as seen from the camera). In this case, the appearance of the individual in question (e.g., the color and shape of clothing) provides an important cue for visual tracking. To this end, a real-time tracker based on the visual appearance of people is used and now described; the tracker can determine when a new person enters the field of view, and construct an appearance model based on color and texture.

An "appearance model" is constructed (step 170) for an individual's profile (i.e., his or her contribution to the people silhouette) as soon as he or she is detected in the person segmentation stage. The starting point for this model is the red, green, and blue color density values for each pixel (R, G, B), in which, for example, R, G, and B vary from 0 to 255. A gray scale value for each pixel is then calculated using the values (R, G, B) simply by averaging R, G, and B. Each pixel's gray scale value is then compared with the gray scale values of its four nearest neighbors (immediately above and below, to the right and to the left). If this comparison yields a difference of greater than 50, then the gradient magnitude is considered to be large, and the edge value E is set equal to 1. On the other hand, if this comparison yields only differences less than or equal to 50, then the gradient magnitude is considered to be small, and E is set equal to 0. Thus, the edge value E is a measure of how rapidly the intensity changes from pixel to pixel (i.e., a gradient magnitude).

A four dimensional parameter is associated with each pixel, namely, (R, G, B, E). It is convenient to uniquely express this parameter as a 15 bit number, in which the first five bits correspond to R, the next five bits correspond to G, the next four bits correspond to B, and the last bit corresponds to E. By adopting this procedure for each pixel in a profile, each pixel is associated with a 15 bit number. The mapping of (R, G, B, E) to a 15 bit number may be denoted mathematically by the function $\gamma$.

For each profile, an appearance model given by a histogram $\theta$ may be constructed in which each 15 bit number is plotted. This histogram is then a representation of the appearance of the profile. Mathematically, the histogram may be expressed as:

$$\theta_i(k) = w \sum_{x \in S_i} \delta[\gamma(r^x, b^x, g^x, e^x) - k] \tag{6}$$

in which k varies from 0 to $2^{15}$, $S_i$ is the set of pixels which belong to person i, $\delta$ is the Kronecker delta function, x is the coordinate of the pixel in the individual's profile, and w is 1 divided by the total number of pixels in $S_i$.

After a histogram has been constructed for an individual in a first frame, the location of that individual in a subsequent frame is determined by computing the similarity of the histogram $\theta$ in the first frame with a number of different histograms in the subsequent frame (step 180). A useful starting point is to calculate the histogram $\alpha_y$.

$$\alpha_y(k) = w' \sum_{x \in R} \delta[\gamma(r^x, b^x, g^x, e^x) - k] \tag{7}$$

Here R is taken to be a square region in the next frame, with the center y of this square located at that coordinate corresponding to the centroid (center of mass) of the person's silhouette (profile) in the first frame. The length/width of the square (denoted herein by r) may be taken to be about ⅔ of the larger of the width or length of the person's silhouette in the first frame. Here w' is a normalization constant equal to one divided by the total number of pixels in the region R.

The "distance" d between the two histograms given in eqs. (6) and (7) can be calculated as:

$$d(\theta, \alpha) = \sum_{u=1}^{n} \theta_i(u) \alpha_y(u). \tag{8}$$

in which n varies from 0 to $2^{15}$ (i.e., over the entire "width" of the histogram).

This procedure is now repeated for different regions $R_i'$ whose center is offset from y, but whose dimensions are equal to those of R. A mean shift iteration may be used to find regions in the next frame having an appearance similar to that of the profile of interest in the first frame (as given by the histogram in eq. (6)). One such approach is given by D. Comaniciu et al. ("Real time tracking of non-rigid objects using mean shift", IEEE Computer Vision and Pattern Recognition Conference, Hilton Head Island, S.C., 2000) and is adopted here, in which a recursive procedure is used that converges quickly to local minima or maxima. A mean shift vector is computed, and the regions $R_i'$ are determined by translating the region R by the mean shift amount. Let $y_i$ represent the vector coordinate associated with the $i^{th}$ candidate centroid within the region $R_i'$ in a series of iterative calculations:

$$y_{i+1} = \frac{\sum_{x_j \in R_i'} x_j c\left(1 - \left\|\frac{y_i - x_j}{r}\right\|\right)\left\|\frac{y_i - x_j}{r}\right\|}{\sum_{x_j \in R_i'} c\left\|\frac{y_i - x_j}{r}\right\|} \quad (9)$$

Here $x_j$ is a vector coordinate in $R_i'$, and $c=0.63$. For each frame, the number of iterations necessary is generally less than 5, and beyond this point further iterations are not found to increase d. In this manner, a "best" centroid position y' (corresponding to a maximum d) is calculated, and the time varying position (trajectory) of a person is then given by y'(t).

In the event that one camera's view is insufficient to monitor a desired area, multiple cameras directed to overlapping areas (or regions) or different spatial regions that are close to one another can be used to extend the effective area. When an individual exits the view of one camera, position and appearance information may be advantageously passed to a tracking program that controls an adjacent camera. One method for accomplishing this is outlined by Javed et al., in which uncalibrated cameras are used. (See O. Javed et al., "Camera Handoff: Tracking in Multiple Uncalibrated Stationary Cameras", IEEE Workshop on Human Motion, HUMO-2000, Austin, Tex., Dec. 7-8, 2000.) Alternatively, one can use a stereo camera system to detect people. This is described in U.S. Pat. No. 5,581,625 to Connell entitled "Stereo vision system for counting items in a queue", which is hereby incorporated by reference. These stereo systems use triangulation to estimate depth of object from the camera. People can be segmented by a simple threshold on the corresponding depth image (range image). For example, all pixels corresponding to objects 3 feet or higher would detect any person taller than 3 feet.

3. Detecting Groups

By analyzing the respective trajectories of various individuals, it is possible to assign different individuals to different groups of socially interconnected individuals. Specifically, by tracking individuals as described above (or by other methods known to those skilled in the art), it is possible to obtain a 2-D trajectory vector as well as scene entry and exit times for each individual. Individuals appearing in frames together who maintain small interbody separation for an extended period of time are taken to be members of the same group.

Figure 7:
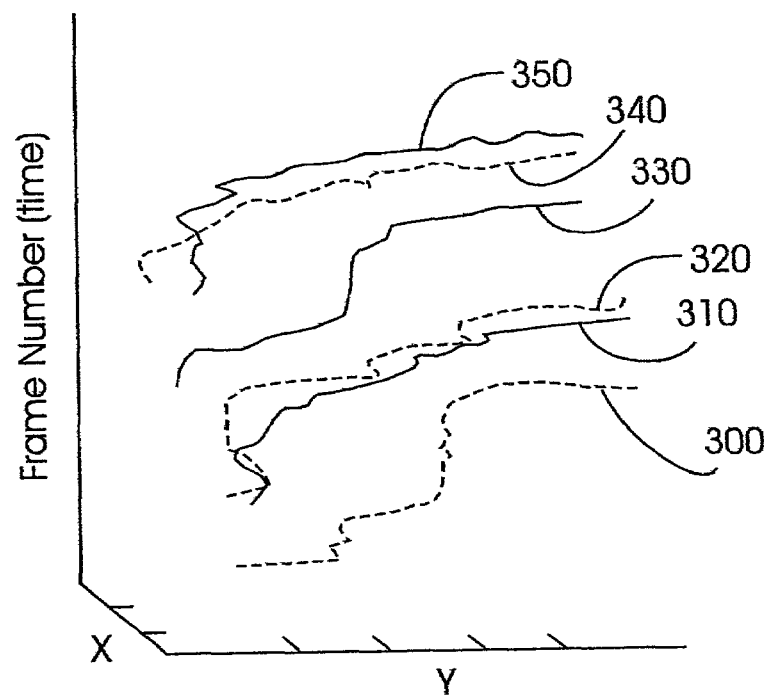
FIG. 7 is a graphical representation of the trajectories (paths) that six different people take as a function of time.

Recovered trajectories 300, 310, 320, 330, 340, 350 for individuals $P_1$, $P_2$, $P_3$, $P_4$, $P_5$, $P_6$, respectively, are shown in FIG. 7, in which trajectories are plotted against both X and Y axes (representing two dimensional movement) and time, which is directly related to the frame number of the recorded video. In this example, $P_1$ has already exited the scene before $P_4$, $P_5$, and $P_6$ have entered it. $P_2$ and $P_3$, on the other hand, are contemporaries and stay relatively close to each other throughout.

The associated analysis can be expressed mathematically as follows. The position vector of the $i^{th}$ person may be defined as:

$$P_i(t) = \{p_i(t_i^1), p_i(t_i^1 + \Delta_1), p_i(t_i^1 + \Delta_2), \ldots, p_i(t_i^1 + \Delta_n)\} \quad (10)$$

in which $t_i^1$ is the time that the $i^{th}$ person $P_i$ enters the scene, and $t_i^2 (=t_i^1 + \Delta_n)$ is time that $P_i$ leaves it. Thus, $S_i = [t_i^1, t_i^2]$ is the time interval during which the $i^{th}$ person $P_i$ is tracked in the scene. For periodically sampled frames and a conventional video sampling interval of 33 msec, $\Delta_n$ is simply n times 33 msec.

The average "distance" $T_d$ between two trajectories $P_i$ and $P_j$ (associated with respective individuals) during the time interval $\tau^2 - \tau^1$ (i.e., the number of frames in which the individuals appear together) during which those individuals are both in the scene can be taken to be (step 190):

$$T_d(i,j) = \frac{\sum_{t=\tau^1}^{\tau^2} \|p_i(t) - p_j(t)\|}{(\tau^2 - \tau^1)}. \quad (11)$$

The quantity $\|p_i(t) - p_j(t)\|$ measures the (Euclidean) distance between the pixels that define the centroids of the $i^{th}$ and $j^{th}$ persons, measured in units of pixels. For example, adjacent pixels sharing a common row have an associated pixel distance of 1.

Figure 8:
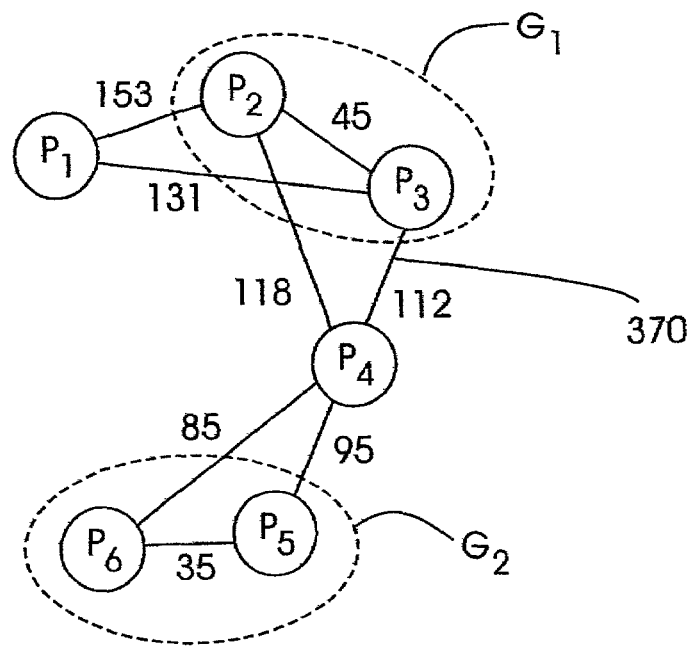
FIG. 8 illustrates the spatial relationships between individuals that appear within a given camera view.

The problem of determining which persons belong to which group (step 200) can be viewed graphically, as shown in the example of FIG. 8, in which the six individuals of FIG. 7 are once again represented by $P_1$, $P_2$, $P_3$, $P_4$, $P_5$, and $P_6$. If two persons appear in a scene together, they are connected by a line segment 370, provided they meet a thresholding test (e.g., for each of the two persons in question, the length of time the two persons appear in the scene together is at least one-third of the total time spent by each person in the scene). Next to these line segments 370 is a weighting factor given by eq. (11) (obtained in connection with a test implementation of the invention), i.e., the average image based distance (in pixels). Those persons linked by a weighting factor less than a predetermined threshold are considered to be members of the same group, by virtue of the fact that they spend a significant amount of time in close proximity to each other. (For a specific implementation of the invention, this threshold was determined empirically to be 50.) In this example, $P_2$ and $P_3$ are assigned to a first group $G_1$, and $P_5$ and $P_6$ are assigned to a second group $G_2$. Although described here with respect to graphical representations, this analysis (as well as the other mathematical analysis related to the methodologies described herein) is preferably carried out on the computer 30 or another processor using executable program code.

In a preferred implementation of the invention in a retail setting, the number of shopping groups in a given queue (checkout line) may be determined using the methodology herein and reported electronically (directly or indirectly) to the manager on duty. To increase customer satisfaction by reducing waiting times, the manager may open up one or more additional checkout lanes when the number of shopping groups in a given checkout lane exceeds a predetermined number.

Since shopping groups leave the scene together after checkout, information about when the cashier starts and finishes serving a shopping group is useful in validating group detection. One way to extract the transaction time intervals for shopping groups involves visually monitoring the activities of the cashier. Similar information could also be obtained from a cash register's transaction logs.

In many stores, cashiers first scan shopping items (scan activity) on a scanner, and then use the cash register to complete the transaction (register activity). The cashier's movements can be captured using a motion-detection algorithm such as the one disclosed herein. Since the scanner and register are in different locations, these different activities can be detected by measuring "activity magnitude" at or near specific locations. Activity magnitude can be defined as the number of pixels classified as motion pixels in a region of interest, such as a region $R^s$ about the scanner or a region $R^r$ about the cash register. The magnitude of scan activity $A_s(t)$ and register activity $A_r(t)$ (as functions of time), respectively, can be computed as follows:

$$A_s(t) = \sum_{x \in R^s} P_m(x) \quad (12)$$

$$A_r(t) = \sum_{x \in R^r} P_m(x) \quad (13)$$

in which the summations are over all pixels in $R^s$ and $R^r$, respectively.

The change in activity magnitude over time thus gives an indication of when a particular activity starts and ends, permitting time intervals for scan activity and register activity to be segmented (distinguished from each other). Furthermore, since scan activity and register activity do not occur at the same time, it is expected that scan activity will follow register activity. By looking at the magnitude of scan activity over a given time interval, the number of individual items scanned by the cashier can be very nearly determined—since items might be scanned multiple times, or not at all, there may be uncertainty as to the actual number of items purchased. Nevertheless, this technique does give information about the efficiency of the cashier.

In preferred embodiments of the invention, there is provided media encoded with executable program code to effect any of the methods described herein. These media may include a magnetic or optical disk or diskette, for example. In preferred embodiments, this program code may be read by a digital processing apparatus such as a computer for performing any one or more of the methods disclosed herein.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A method of detecting groups of individuals within a number of people, comprising:
    visually recording movement of the people over time by generating a series of images of a scene;
    detecting the presence of the individuals in the images;
    tracking movement of the individuals to determine their respective trajectories; and
    analyzing the trajectories to determine the existence of the groups of individuals, wherein individuals in each of the groups: i) move together after another group has completed a transaction and ii) exit the scene together after having completed their own transaction.

2. The method of claim 1, said analyzing the trajectories including determining relative distances between individuals.

3. The method of claim 1, said detecting the presence of individuals including:
    for at least a first image, constructing a modified image of pixels in which pixels corresponding to objects whose positions remain fixed are excluded from the modified image;
    temporally segmenting the modified image; and
    assigning respective portions of the modified image to said individuals.

4. The method of claim 3, comprising using color to distinguish the individuals from the objects.

5. The method of claim 3, wherein an individual's trajectory is determined by analyzing the color of pixels on sequential images in conjunction with a tracking algorithm.

6. The method of claim 5, wherein the tracking algorithm is a mean-shifting tracking algorithm.

7. The method of claim 5, wherein an individual's trajectory is determined with the aid of color density analysis of edges of the portions.

8. The method of claim 1, wherein at least some of the groups are waiting in a line.

9. The method of claim 8, further comprising counting the number of groups in the line.

10. The method of claim 9, wherein the groups are shopping groups in a given checkout lane, the method further comprising opening at least one additional checkout lane when the number of groups in said given checkout lane exceeds a predetermined number.

11. The method of claim 1, said recording movement comprising using a plurality of cameras, wherein the cameras are directed at different spatial regions.

12. The method of claim 1, wherein said series of images includes a series of stereo images.

13. A method for use with a single checkout lane, comprising:
    camera recording people in the checkout lane, thereby generating a series of images;
    resolving individual persons within the images; and
    determining relative distances between the persons over time to identify shopping groups of individuals who are together in the checkout lane, the shopping groups being respective sets of people who check out together as a group, the shopping groups in the single checkout lane checking out at different times.

14. The method of claim 13, comprising electronically counting the number of shopping groups in the checkout lane.

15. The method of claim 14, further comprising opening at least one additional checkout lane in response to said counting.

16. A computer readable memory medium having computer-executable program instructions thereon for carrying out the steps of:
    visually recording movement of people over time by generating a series of images of a scene;
    detecting the presence of individuals in the images;
    tracking movement of the individuals to determine their respective trajectories; and
    analyzing the trajectories to determine the existence of groups of individuals, wherein individuals in each of the groups: i) move together after another group has completed a transaction and ii) exit the scene together after having completed their own transaction.

17. A computer readable memory medium having computer-executable program instructions thereon for carrying out the steps of:
    camera recording people in a single checkout lane, thereby generating a series of images;
    resolving individual persons within the images; and
    determining relative distances between the persons over time to identify shopping groups of individuals who are together in the checkout lane, the shopping groups being respective sets of people who check out together as a group, the shopping groups in the single checkout lane checking out at different times.

18. The method of claim 13, further comprising determining transaction time intervals for the shopping groups by visually monitoring activities of a cashier.

19. The method of claim 13, further comprising determining transaction time intervals for the shopping groups from a cash register's transaction logs.

20. The method of claim 13, comprising validating group detection using information about when a cashier starts and finishes serving a shopping group.

21. The method of claim 13, wherein individuals in each of the shopping groups: i) move together after another group has completed a transaction and ii) exit the scene together after having completed their own transaction.

22. The method of claim 1, wherein the groups include at least one of the following: a clique, a family unit, and a group of friends.

23. The method of claim 13, wherein the shopping groups include at least one of the following: a clique, a family unit, and a group of friends.

* * * * *